(12) United States Patent
Rogers et al.

(10) Patent No.: US 10,829,387 B2
(45) Date of Patent: Nov. 10, 2020

(54) SYSTEM AND METHOD FOR MANAGING TOXICITY FROM HIGH TOTAL DISSOLVED SOLIDS (TDS) WATER DISCHARGES

(71) Applicant: ARCADIS Corporate Services, Inc., Highlands Ranch, CO (US)

(72) Inventors: Stephen E. Rogers, Loveland, CO (US); Joseph S. Meyer, Golden, CO (US)

(73) Assignee: ARCADIS Corporate Services, Inc., Highlands Ranch, CO (US)

( * ) Notice: Subject to any disclaimer, the term of this patent is extended or adjusted under 35 U.S.C. 154(b) by 0 days.

(21) Appl. No.: 15/762,764

(22) PCT Filed: Sep. 26, 2016

(86) PCT No.: PCT/US2016/053709
§ 371 (c)(1),
(2) Date: Mar. 23, 2018

(87) PCT Pub. No.: WO2017/053942
PCT Pub. Date: Mar. 30, 2017

(65) Prior Publication Data
US 2019/0077678 A1    Mar. 14, 2019

Related U.S. Application Data

(60) Provisional application No. 62/233,111, filed on Sep. 25, 2015.

(51) Int. Cl.
*C02F 1/00*    (2006.01)
*C02F 1/68*    (2006.01)
(Continued)

(52) U.S. Cl.
CPC ............... *C02F 1/008* (2013.01); *B01D 1/00* (2013.01); *C02F 1/68* (2013.01);
(Continued)

(58) Field of Classification Search
None
See application file for complete search history.

(56) References Cited

U.S. PATENT DOCUMENTS

2005/0139530 A1*  6/2005  Heiss ................... C02F 9/00
                                                210/85
2006/0237369 A1  10/2006  Kirts et al.

OTHER PUBLICATIONS

International Search Report, PCT Patent Appln. No. PCT/US2016/053709, dated Dec. 27, 2016.
(Continued)

*Primary Examiner* — Richard C Gurtowski
(74) *Attorney, Agent, or Firm* — Nancy J. Flint, Attorney at Law, P.A.; Nancy J. Flint, Esq.

(57) ABSTRACT

A system and method for management of point source discharges (e.g., mining, pulp and paper, other industrial/municipal) characterized by elevated (e.g., >1,000 mg/L) Total Dissolved Solids (TDS) concentrations to achieve compliance with Whole Effluent Toxicity (WET) requirements, where the aquatic toxicity is related to what is commonly referred to as TDS/ion imbalance, is disclosed. Concentrations of major inorganic ions in a water sample(s) that cause toxicity to aquatic organisms are analyzed to determine which of those cations and anions are deficient in the water sample(s); thereafter it is determined which ion-ratios in the sample(s) contribute to the toxicity to aquatic organisms; and thereafter it is determined which cations and anions to add to the water sample(s) to achieve compliance with aquatic toxicity regulations.

12 Claims, 11 Drawing Sheets

Pilot Plant Schematic

(51) Int. Cl.
  B01D 1/00 (2006.01)
  *C02F 103/00* (2006.01)
  *C02F 103/28* (2006.01)
  *C02F 103/36* (2006.01)
(52) U.S. Cl.
  CPC .... *C02F 2103/007* (2013.01); *C02F 2103/28* (2013.01); *C02F 2103/365* (2013.01); *C02F 2209/001* (2013.01); *C02F 2209/003* (2013.01); *C02F 2209/10* (2013.01)

(56) References Cited

OTHER PUBLICATIONS

Written Opinion, PCT Patent Appln. No. PCT/US2016/053709, dated Dec. 27, 2016.
Goodfellow W. L. et al., "Major ion toxicity in effluents: a review with permitting recommendations", Environmental Toxicology and Chemistry [online], Nov. 2, 2009 (Nov. 2, 2009) [retrieved on Nov. 15, 2016], vol. 19, issue 1, retrieved from the Internet: <DOI: 3-4, 10-11 10.1002/etc.5620190121>, pp. 175-182; see entire document, especially p. 175-181.
"Method Guidance and Recommendations for Whole Effluent Toxicity (WET) Testing (40 CFR Part 136)", United States Environmental Protection Agency (EPA), Office of Water, Document EPA 821-B-00-004 [online], Jul. 2000 (Jul. 2000) [retrieved on Nov. 15, 2016], retrieved from the Internet:< https://www.epa.gov/sites/production/files/2016-02/documents/method-guidance-recommendations-wet-testing_2000.pdf>, 60 pp.; see entire document, especially p. 3-1, 4-1-4-2; Figs. 4-1, 4.3-4.12.
"Whole Effluent Toxicity Testing: Ion Imbalance", Society of Environmental A Toxicology and Chemistry—Environmental Quality Through Science (SETACTIP), , 2004 (2004) [retrieved on Nov. 15, 2016], retrieved from the Internet: <https://c.ymcdn.com/sites/www.setac.org/resource/resmgr/publications_and_resources/tipion.pdf>, 4 pp.; see entire document.

\* cited by examiner

Ceriodaphnia dubia Reproduction vs. Total Dissolved Solids (TDS)

▲ = Undiluted industrial effluent samples

● = Industrial effluent samples diluted with laboratory water (moderately hard reconstituted water; indicated as MHRW)

1 = Threshold of impairment
MHRW = Moderately hard reconstituted water

▲ = Undiluted industrial effluent samples

● = Industrial effluent samples diluted with laboratory water (moderately hard reconstituted water; indicated as MHRW)

Legend:

▲ = Undiluted industrial effluent samples

● = Industrial effluent samples diluted with laboratory water (moderately hard reconstituted water; indicated as MHRW)

Legend:
 1 = Normalized ion ratios in dilution water
 2 = Normalized ion ratios in effluent
Alk = Alkalinity
Cl = Chloride
Mg = Magnesium
Na = Sodium
$SO_4$ = Sulfate
━━━━ = Concentration-response curve for reproduction
━ Na:Mg ━ = Normalized ion ratio (example shown for Na:Mg ratio)

▨ = Maximum effluent % at which reproduction is approximately 100%

Legend:
    1 = Normalized ion ratios in dilution water
    2 = Normalized ion ratios in effluent
  Alk = Alkalinity
   Cl = Chloride
  Mg = Magnesium
  Na = Sodium
 $SO_4$ = Sulfate
━━━ = Concentration-response curve for reproduction
━ Na:Mg ━ = Normalized ion ratio (example shown for Na:Mg ratio)

▓ = Maximum effluent % at which reproduction is approximately 100%

FIGURE 7

Industrial Effluent + NaHCO$_3$ + MgCl$_2$

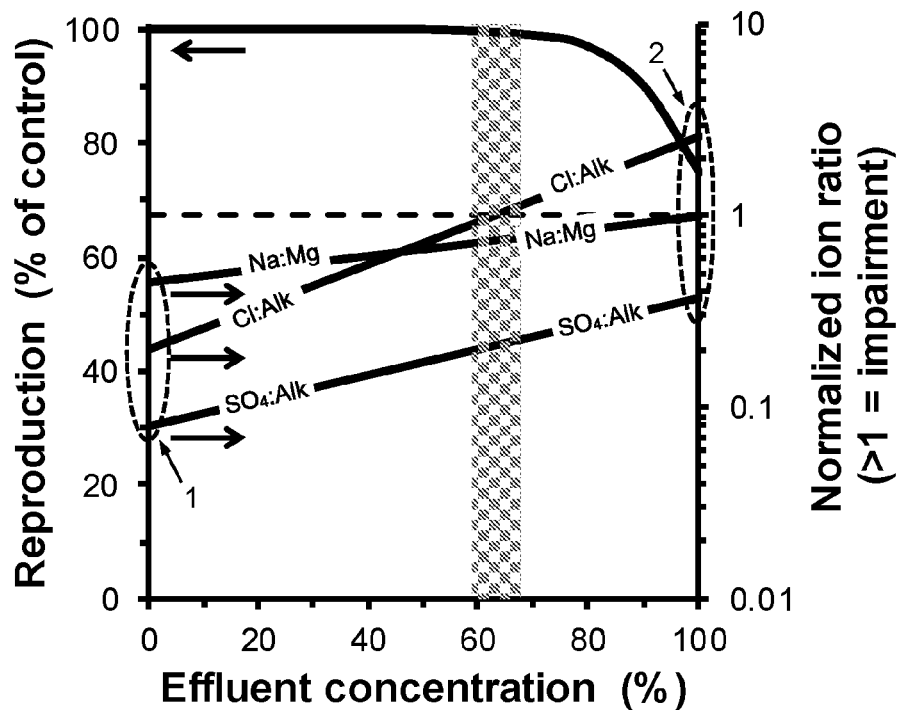

Legend:
- 1 = Normalized ion ratios in dilution water
- 2 = Normalized ion ratios in effluent
- Alk = Alkalinity
- Cl = Chloride
- Mg = Magnesium
- Na = Sodium
- SO$_4$ = Sulfate
- ——— = Concentration-response curve for reproduction
- ▬ Na:Mg ▬ = Normalized ion ratio (example shown for Na:Mg ratio)
- ▨ = Maximum effluent % at which reproduction is approximately 100%

FIGURE 8

Industrial Effluent + Mg(HCO$_3$)$_2$

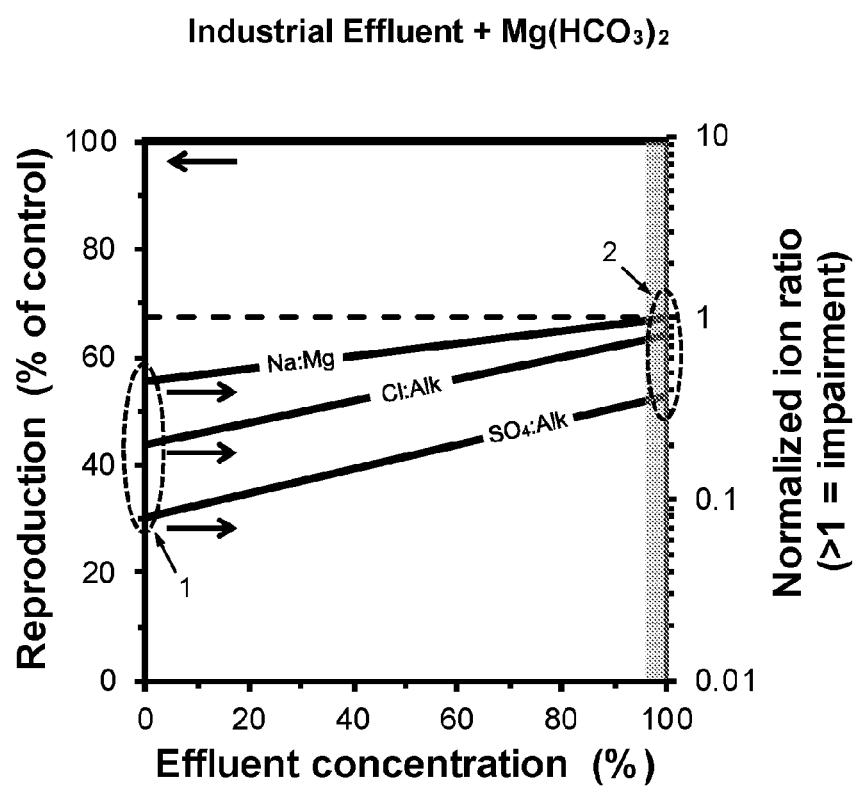

Legend:
    1 = Normalized ion ratios in dilution water
    2 = Normalized ion ratios in effluent
  Alk = Alkalinity
   Cl = Chloride
  Mg = Magnesium
  Na = Sodium
 SO$_4$ = Sulfate
━━━━ = Concentration-response curve for reproduction
━ Na:Mg ━ = Normalized ion ratio (example shown for Na:Mg ratio)

▓▓▓ = Maximum effluent % at which reproduction is approximately 100%

Pilot Plant Schematic

Conceptual Ion-Ratio Toxicity Curves
FIGURE 11A
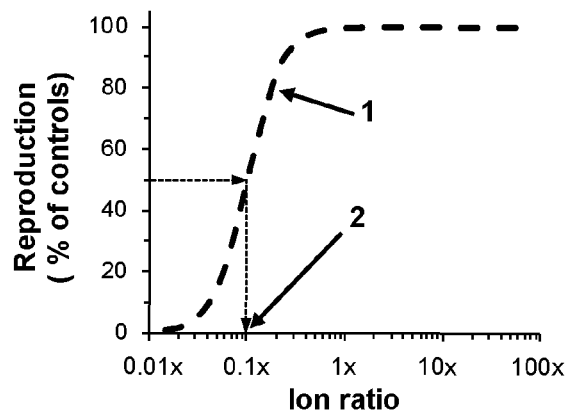
FIGURE 11B
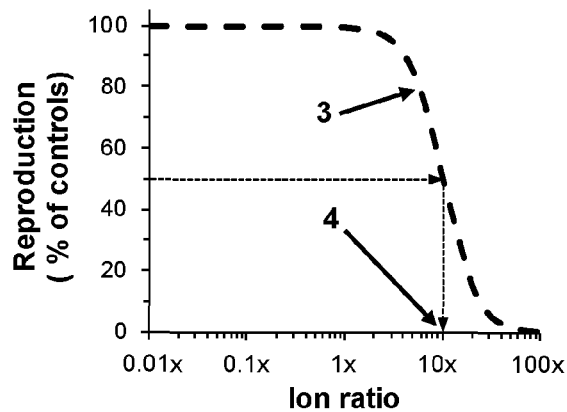
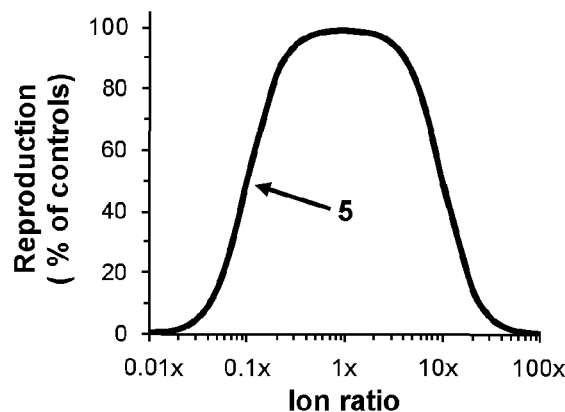
FIGURE 11C
Legend:
1 = Left-hand toxicity response curve
2 = EC50 of left-hand toxicity response curve
3 = Right-hand toxicity response curve
4 = EC50 of right-hand toxicity response curve
5 = Combined toxicity response curve

SYSTEM AND METHOD FOR MANAGING TOXICITY FROM HIGH TOTAL DISSOLVED SOLIDS (TDS) WATER DISCHARGES

FIELD OF THE INVENTION

The invention relates to a system and method for management of point source discharges (e.g., mining, pulp and paper, other industrial/municipal) characterized by elevated Total Dissolved Solids (TDS) concentrations (e.g., >1,000 mg/L) by ion-ratio balancing to achieve compliance with Whole Effluent Toxicity (WET) requirements, where the aquatic toxicity is related to what is commonly referred to as TDS/ion imbalance. Major inorganic ions ($Ca^{2+}$, $Mg^{2+}$, $Na^+$, $K^+$, $HCO_3^-$, $Cl^-$, $SO_4^{2-}$) that can cause toxicity to aquatic organisms when present at concentrations above natural conditions in a water sample(s), are analyzed to determine which of those cations and anions are deficient in the water sample(s); thereafter it is determined which imbalanced ion-ratios in the sample(s) contribute to the toxicity to aquatic organisms; and thereafter it is determined which cations and anions to add to the water sample(s) to balance the imbalanced ion ratios to achieve compliance with aquatic toxicity regulations.

BACKGROUND OF THE INVENTION

Toxic substances, such as metals, minerals and salts, are present in industrial, municipal, and other aqueous point source discharges (effluents) due to a variety of sources. Whole Effluent Toxicity (WET) refers to the aggregate toxic effect to aquatic organisms from all pollutants contained in wastewater (effluent). The Federal Clean Water Act (CWA) prohibits the discharge of toxic pollutants in toxic amounts. Whole Effluent Toxicity (WET) describes the aggregate toxic effect of an aqueous sample (e.g., whole effluent wastewater discharge) as measured by an organism's response upon exposure to the sample (e.g., lethality, impaired growth, or reproduction). EPA's WET tests simulate the total effect of environmental exposure of aquatic life to toxic pollutants in an effluent without requiring the identification of the specific pollutants. The current guidance for WET testing dated July 2000 (Method Guidance and Recommendations for Whole Effluent Toxicity (WET) Testing (40 CFR Part 136)) as set forth by the EPA can be found at <https://www.epa.gov/sites/production/files/2016-02/documents/method-guidance-recommendations-wet-testing_2000.pdf>. Many states also provide guidance for conducting WET tests. For example, the current guidance from the State of Colorado is titled Laboratory Guidelines for Conducting Whole Effluent Toxicity Tests, March 1998, and can be found at <http://colowqforum.org/pdfs/whole-effluent-toxicity/01-2010/Lab%20Guidance%20March%201998.pdf>.

WET testing is a vital component to implementing water quality standards under the National Pollutant Discharge Elimination System (NPDES) permits program in accordance with the CWA Section 402. It supports meeting the goals of the CWA Section 101(a) and (2), especially with respect to restoring and maintaining "the chemical, physical, and biological integrity of the Nation's waters and " . . . the protection and propagation of fish, shellfish, and . . . ."

These toxic substances are typically well controlled by existing water treatment practices. Current advanced water treatment (AWT) practices address aggregate TDS reduction (e.g., ion exchange (IX), reverse osmosis (RO), nanofiltration (NF)) or the specific removal of calcium and sulfate ions by precipitation of ettringite (a calcium-aluminum-sulfate mineral). Currently accepted major-ion removal technologies used today are capital intensive, energy intensive, operations intensive (labor and chemicals), or all three. However, these advanced water treatment (AWT) practices do not necessarily produce a nontoxic effluent. Additionally, these ion removal technologies produce significant quantities of waste (e.g., IX spent regenerant, RO or NF concentrate, ettringite sludge).

When the toxicity of an effluent is related to TDS/ion imbalance, no current water treatment practices are specifically aimed at decreasing TDS/ion imbalance-related aquatic toxicity.

SUMMARY OF THE INVENTION

The system and method of the invention identifies the cations and anions required, their concentrations, and their points of application to balance ion-ratios in an aqueous sample to produce WET-compliant point source effluents in a cost-effective, sustainable manner for those instances in which the aquatic toxicity is related to ion ratio imbalance.

According to one embodiment of the invention, concentrations of major inorganic ions in a water sample(s) that cause its toxicity to aquatic organisms are analyzed to determine which of those cations and anions are deficient in the water sample(s); thereafter to determine which ion-ratios in the sample(s) contribute to the toxicity to aquatic organisms; and thereafter to determine which cations and anions to add to the water sample(s) to achieve compliance with aquatic toxicity regulations. Ion-ratio balancing via the addition of relatively small amounts of ions to an effluent (i.e., adding TDS to decrease apparent TDS-related aquatic toxicity), without producing waste residuals, is an alternative to current known and used major-ion removal technologies.

Ion-ratio balancing comprises the addition of relatively small amounts of ions to the effluent (i.e., adding TDS to decrease apparent TDS-related toxicity) to correct skewed ion-ratios in industrial, municipal, or other water. Because only ions are added and nothing is removed, the system and method produces no waste residuals that require disposal.

BRIEF DESCRIPTION OF THE DRAWINGS

The invention will be described with reference to the accompanying drawings, in which like elements are referenced with like numerals.

FIG. 2A depicts a chart of ion or ion-ratio deficiency from concentration-response curves that have a positive slope on the respective chart of % toxicological response vs. ion concentration or ion-ratio. FIG. 2B depicts a chart of ion or ion-ratio toxicity from concentration-response curves that have a negative slope on the respective chart of % toxicological response vs. ion concentration or ion-ratio, and showing the Threshold of Impairment.

FIG. 3A depicts magnesium (Mg) deficiency. FIG. 3B depicts Alkalinity deficiency.

FIG. 4A depicts $SO_4^{2-}$:Alkalinity toxicity. FIG. 4B depicts $Na^+$:$Mg^{2+}$ toxicity.

FIG. 7 depicts the effects of sodium bicarbonate ($NaHCO_3$) plus magnesium chloride ($MgCl_2$) addition to industrial effluent.

FIG. 8 depicts the effects of magnesium bicarbonate ($Mg(HCO_3)_2$) addition to industrial effluent.

FIG. 11 depicts the general toxicity curve determined from both the positively-sloped curve (deficiency) and the negatively-sloped curve (toxicity) for each ion pair ratio.

DETAILED DESCRIPTION OF THE INVENTION

Figure 1:
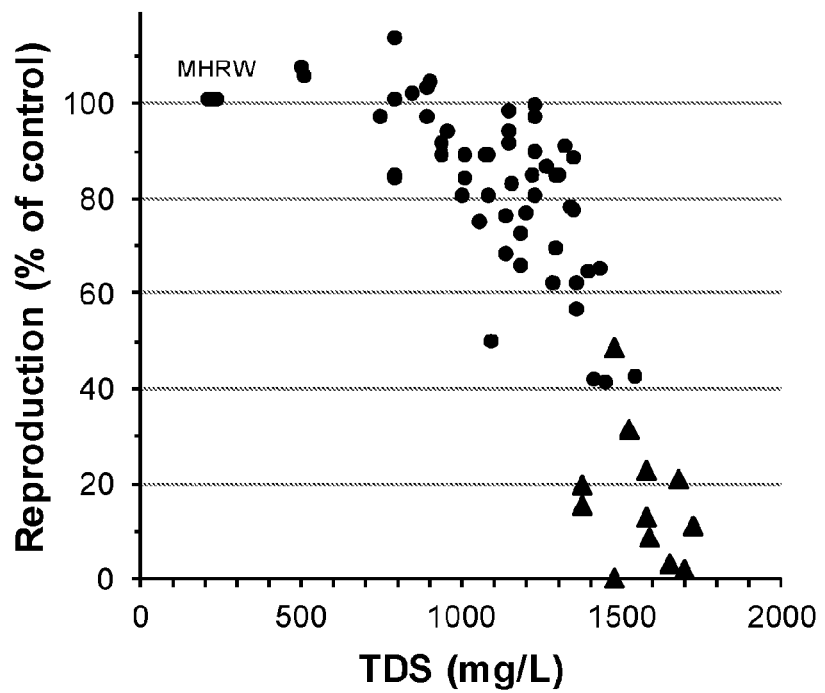
FIG. 1 depicts an example chart of WET test results of *Ceriodaphnia dubia* reproduction vs. TDS.

According to one embodiment, the invention comprises a system and method to 1) analyze concentrations of major inorganic ions in a water sample(s) that cause its toxicity to aquatic organisms; 2) determine which of those cations and anions are deficient in the water sample(s); 3) determine which ion-ratios in the sample(s) contribute to the toxicity to aquatic organisms; and 4) determine which cations and anions to add to the water sample(s), at what concentrations, and at what locations, to achieve compliance with aquatic toxicity regulations. According to one embodiment, the system and method:

1. Acquires data on ion-ratio toxicity by examining WET test results (including reference toxicant test results, if available), paired chemical analytical results (major ions: calcium, magnesium, sodium, potassium, chloride, sulfate, alkalinity [as bicarbonate ion at the pH of the effluent]; and other potential toxicants such as aluminum, cadmium, copper, lead, manganese, zinc);
2. Performs various manipulations to the data, including statistical methods, to parse out the effects of various ions and ion-ratios;
3. Determines critical ion-ratios and deficient ions for a particular effluent; and
4. Calculates required cations and anions to balance ion-ratios, including dosage concentrations and chemical addition locations within the water treatment train of unit processes.

To carry out this method, the following steps are performed:

1. Collect sample of water to be tested according to acceptable collection protocol as known to those skilled in the art. Perform WET test according to EPA manuals and test for paired chemical analyses of seven (7) major inorganic ions ($Ca^{2+}$; $Mg^{2+}$; $K^+$; $Na^+$; $Cl^-$; $SO_4^{2-}$; $HCO_3^-$). In addition, test the water sample for other potential toxicants including metals such as Al, Cd, Cu, Fe, Mn, Pb, and Zn, and further for additional potential toxicants known to be present or that have a reasonable potential to be present. Typically, such other potential toxicants are listed on a discharge permit, having already been identified by regulators. Testing is conducted according to known methods, including but not limited to ion chromatography, and cations and metals by inductively-coupled plasma. There should be a zero head space in WET and Alkalinity samples.
2. Receive inputs from WET test (dilution series using WET laboratory dilution water, reference toxicant dilution series, if available) and paired chemical analyses performed on the sample of water.
3. Chart WET test results [toxicological response (e.g., survival, growth, reproduction) of test organisms (e.g., *Ceriodaphnia dubia*) vs. % effluent] and chart toxicological response vs. the concentration of each of the major ions analyzed in the water sample in Step 1, and the molar concentration ratio of each ion pair.
4. Determine "goodness of fit" of the charted results to sigmoid concentration-response curves, and discard from further consideration those charts that do not demonstrate a clear concentration-response relationship to a person skilled in the art of aquatic toxicology.
5. Determine ion deficiency by isolating those concentration-response curves that exhibit a positive slope on the respective chart of % toxicological response (e.g., survival, growth, reproduction) vs. ion concentration that were not discarded in Step 4.
6. Rank ion deficiency from most deficient (least abundant) ions to least deficient (most abundant) ions from the results in Step 5.
7. Determine metal toxicity by isolating those concentration-response curves that have a negative slope on the respective chart of % toxicological response (e.g., survival, growth, reproduction) vs. metal concentration (analyzed in Step 1).
8. Determine ion-ratio toxicity by isolating those concentration-response curves that have a negative slope on the respective chart of % toxicological response (e.g., survival, growth, reproduction) vs. ion-ratio (when the deficient ion is in the denominator of the ratio).
9. Rank ion-ratio toxicity from most toxic ion-ratio to least toxic ion-ratio.
10. Determine, for each toxic ion-ratio chart, the "Threshold of Impairment." The Threshold of Impairment is the ion-ratio at which a decrease in the toxicological response (e.g., survival, growth, reproduction) is first observed, i.e. the point at which impairment is first indicated.
11. Normalize each ion-ratio by dividing the measured ion-ratio by the respective Threshold of Impairment. By definition, a normalized ion-ratio of >1 signifies impairment due to that ion-ratio. A normalized ion-ratio of ≤1 signifies no impairment due to that ion-ratio (i.e., not an imbalanced ion-ratio).
12. Identify ion-ratios that are most critical to the toxicity of the water sample(s). The critical ion ratios are those with the numerically higher normalized ion ratios. The critical ion ratios are those that differ the most from the balanced ion ratios in the laboratory dilution water.
13. Determine, for the above critical ratios, the amounts of ions required to reduce the most limiting ion-ratio to unity, without adding a counter-ion that would increase other normalized ion-ratios to >1.
14. Determine the most appropriate chemical(s) to achieve balanced ion-ratios determined in Step 12 above. The most appropriate chemicals are those that contribute deficient ions, decrease the critical normalized ion ratios to ≤1, and create no new normalized ion ratios with a value>1.
15. Calculate the amount of selected chemical(s) to be added to the water sample(s). The calculated amounts of chemicals are the amounts that decrease critical normalized ion ratios to ≤1, without increasing other critical normalized ion ratios to values>1.

16. Check to see if additions of the chemicals determined in Step 15 will cause other ion imbalances in the 21 major-ion ratios possible from the pairing of the 7 major ions (six (6) cation:cation pairs ($Ca^{2+}:Mg^{2+}$, $Ca^{2+}:K^+$, $Ca^{2+}:Na^+$, $Na^+:Mg^{2+}$, $Na^+:K^+$, $K^+:Mg^{2+}$); three (3) anion:anion pairs ($Cl^-:SO_4^{2-}$, $Cl^-:HCO_3^-$, $SO_4^{2-}:HCO_3^-$); and twelve (12) cation:anion pairs ($Ca^{2+}:Cl^-$, $Ca^{2+}:SO_4^{2-}$, $Ca^{2+}:HCO_3^-$, $Mg^{2+}:Cl^-$, $Mg^{2+}:SO_4^{2-}$, $Mg^{2+}:HCO_3^-$, $Na^+:Cl^-$, $Na^+:SO_4^{2-}$, $Na^+:HCO_3^-$, $K^+:Cl^-$, $K^+:SO_4^{2-}$, $K^+:HCO_3^-$).

17. Determine the location in a water treatment train of unit processes for the addition of the chemical(s) determined in Step 15. The location and scheme of addition is determined by the best professional judgment of someone skilled in the art of water treatment as different addition schemes may be appropriate for different effluents. In some embodiments, for example, a solution comprising the chemicals to be added would be injected into an effluent. In some embodiments, a solution comprising the chemicals to be added would be mixed with the effluent.

Turning to the figures, FIG. 1 depicts an example chart of WET test results [toxicological response (e.g., survival, growth, reproduction) of test organisms (e.g., *Ceriodaphnia dubia*)] vs. the TDS concentration of the water sample (typically the sum of the major ions). In a manner identical to FIG. 1, a separate chart of WET results [toxicological response (e.g., survival, growth, reproduction)] vs. ion concentration or ion ratio is plotted for each of the 7 major ions described in Step 1 above, the 21 ion-pair ratios, TDS, and conductivity. Charts are also prepared plotting WET results [toxicological response (e.g., survival, growth, reproduction)] vs. ion concentration of other potential toxicants such as Al, Cd, Cu, Fe, and Zn. For the example effluent described infra in this application, 34 separate charts were plotted.

Figure 2A:
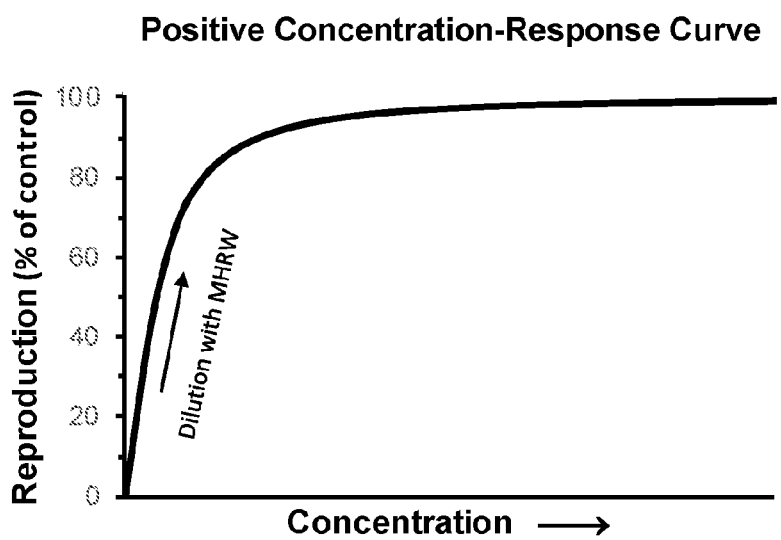
FIGS. 2A and 2B depict generalized concentration-response curves.
Figure 2B:
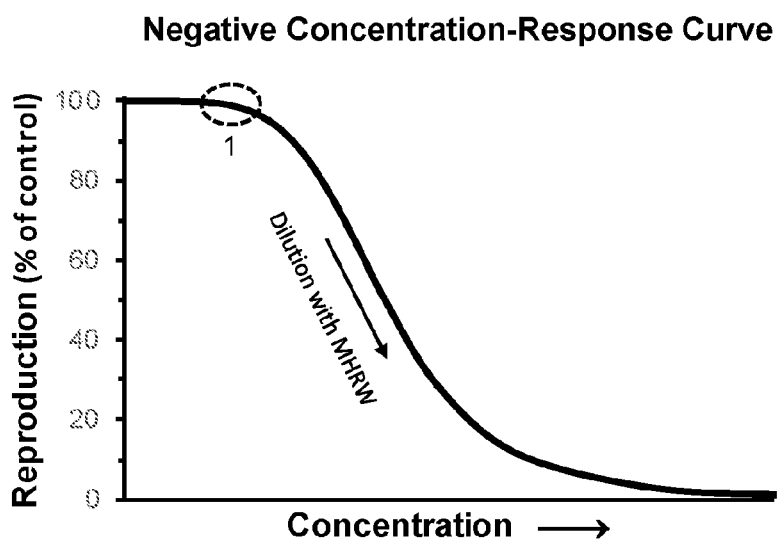

FIG. 2A depicts a generalized concentration-response curve of ion deficiency that has a positive slope on the respective chart of % toxicological response (e.g., survival, growth, reproduction) vs. ion concentration. FIG. 2B depicts a generalized concentration-response curve of ion toxicity that has a negative slope on the respective chart of % toxicological response (e.g., survival, growth, reproduction) vs. ion concentration. The Threshold of Impairment described in Step 10 supra (paragraph [0027]) is signified by the reference numeral 1.

Figure 3A:
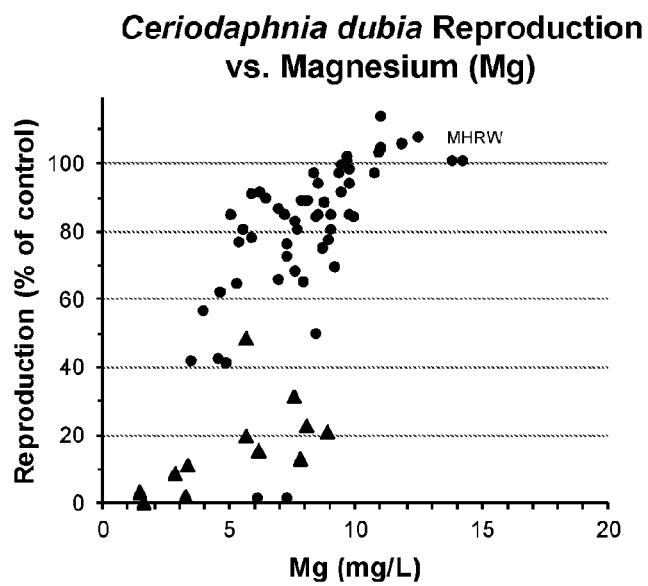
FIGS. 3A and 3B depict charts of ion deficiency from concentration-response curves that have a positive slope on the respective chart of % toxicological response vs. ion concentration.
Figure 3B:
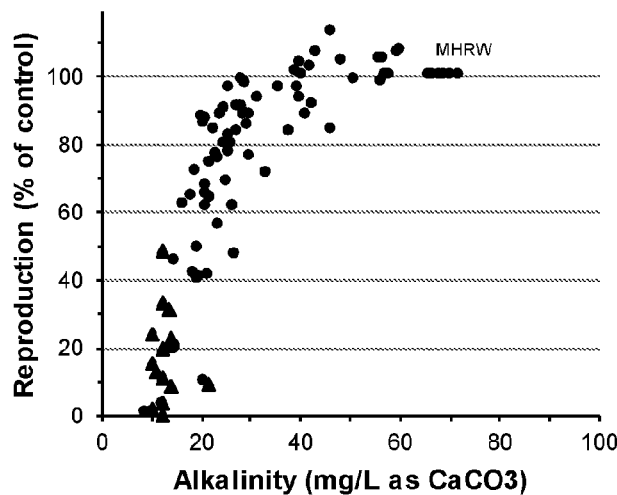
Figure 4A:
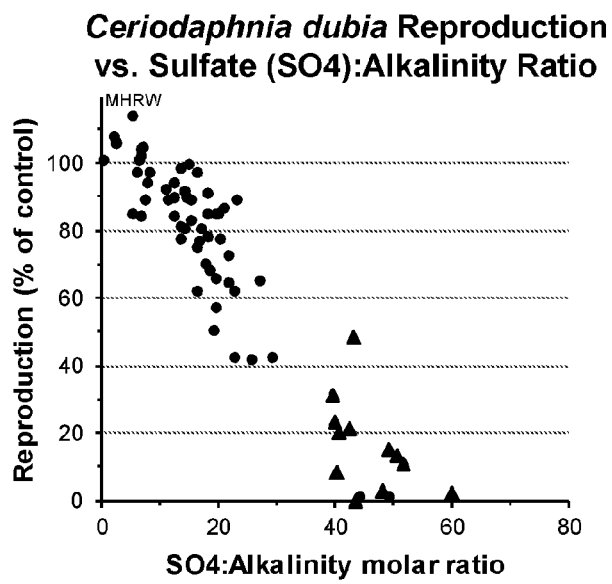
FIGS. 4A and 4B depict charts of ion ratio toxicity from concentration-response curves that have a negative slope on the respective chart of % toxicological response vs. ion-ratio.
Figure 4B:
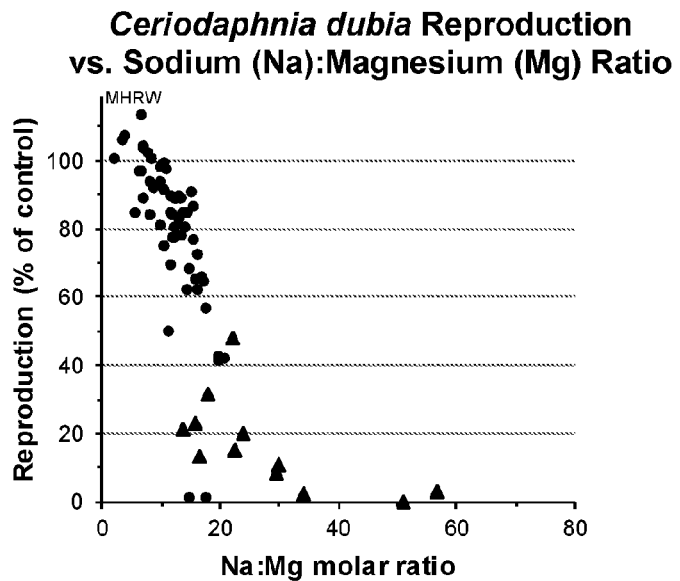

FIGS. 3A and 3B depict charts of ion deficiency from concentration-response curves that were not discarded in Step 4 and that have a positive slope on the respective chart of % toxicological response (e.g., survival, growth, reproduction) vs. ion-ratio (when the deficient ion is in the denominator of the ratio). FIG. 3A depicts magnesium (Mg) deficiency. FIG. 3B depicts Alkalinity deficiency FIGS. 4A and 4B depict charts of ion ratio toxicity from concentration-response curves that were not discarded in Step 4 and that have a negative slope. FIG. 4A depicts $SO4^{2-}$:Alkalinity toxicity. FIG. 4B depicts $Na^+:Mg^{2+}$ toxicity.

The results and interpretation of the system and method of the invention are synthesized into what is termed the "Ion-Ratio Toxicity Model," which is graphically shown in FIGS. 5 through 8.

Figure 5:
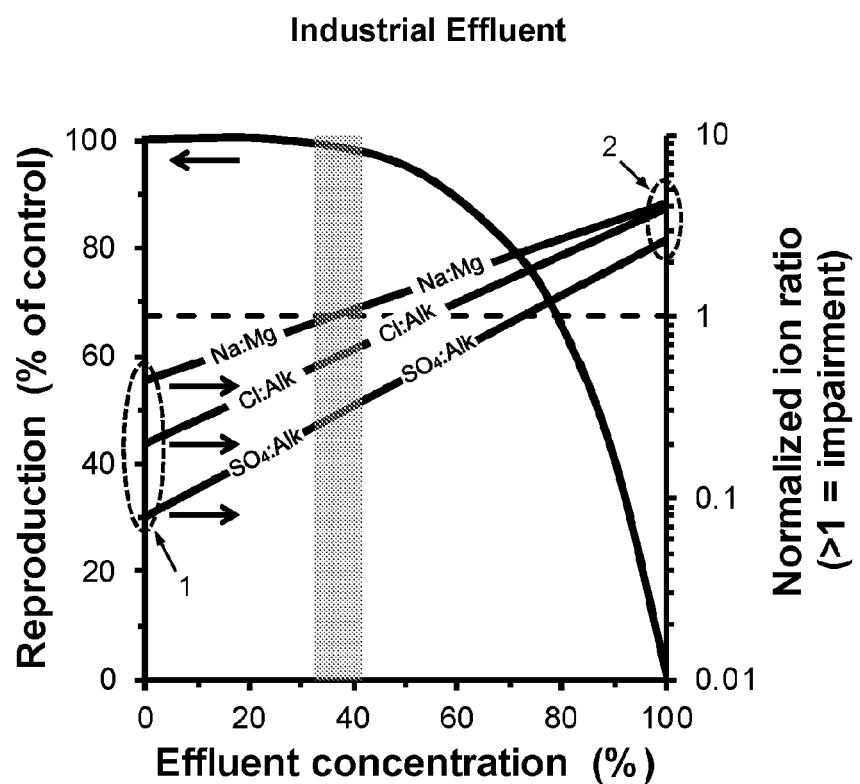
FIG. 5 depicts a lime-treated industrial effluent toxicity chart of % *C. dubia* reproduction vs. effluent dilutions.

FIG. 5 depicts a lime-treated industrial effluent toxicity chart of % reproduction (compared to control reproduction) vs. % effluent concentration. The normalized ion ratios of the laboratory dilution water are signified by reference numeral 1. The normalized ion ratios of the industrial effluent are signified by reference numeral 2.

Figure 6:
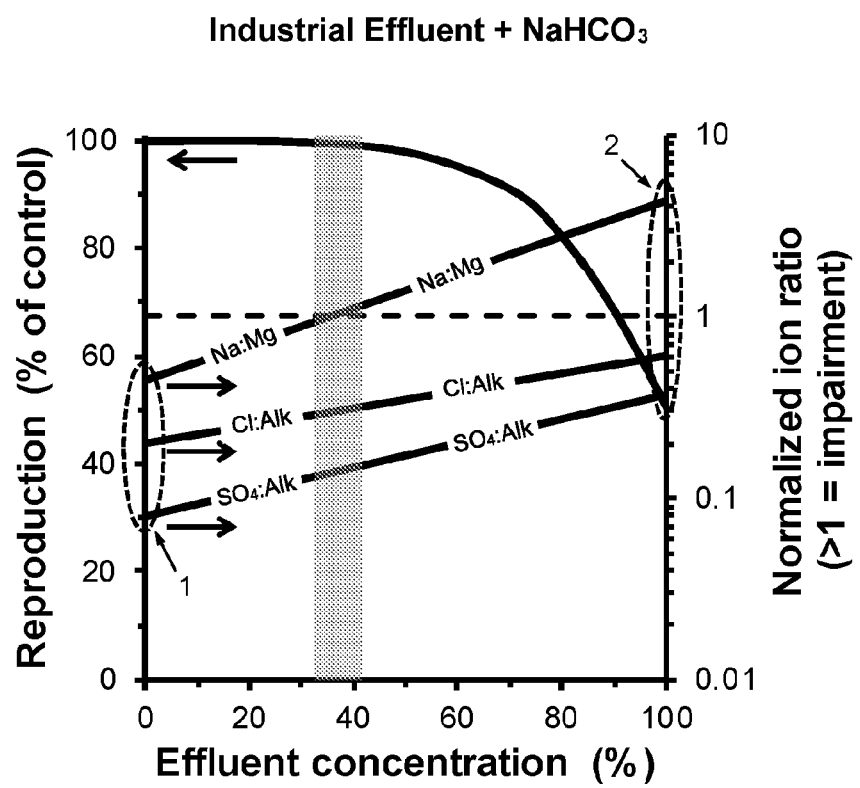
FIG. 6 depicts the effects of sodium bicarbonate ($NaHCO_3$) addition to industrial effluent.

FIG. 6 depicts the effects of sodium bicarbonate ($NaHCO_3$) addition to the industrial effluent. The charts shows % reproduction (compared to control reproduction) vs. % effluent concentration. The normalized ion ratios of the laboratory dilution water are signified by reference numeral 1. The normalized ion ratios of the sodium bicarbonate-amended industrial effluent are signified by reference numeral 2.

FIG. 7 depicts the effects of sodium bicarbonate ($NaHCO_3$) plus magnesium chloride ($MgCl_2$) addition to the industrial effluent. The chart shows % reproduction (compared to control reproduction) vs. % effluent concentration. The normalized ion ratios of the laboratory dilution water are signified by reference numeral 1. The normalized ion ratios of the sodium bicarbonate/magnesium chloride-amended industrial effluent are signified by reference numeral 2.

FIG. 8 depicts the effects of magnesium bicarbonate ($Mg(HCO_3)_2$) addition to the industrial effluent. The charts shows % reproduction (compared to control reproduction) vs. % effluent concentration. The normalized ion ratios of the laboratory dilution water are signified by reference numeral 1. The normalized ion ratios of the magnesium bicarbonate-amended industrial effluent are signified by reference numeral 2.

Figure 9:
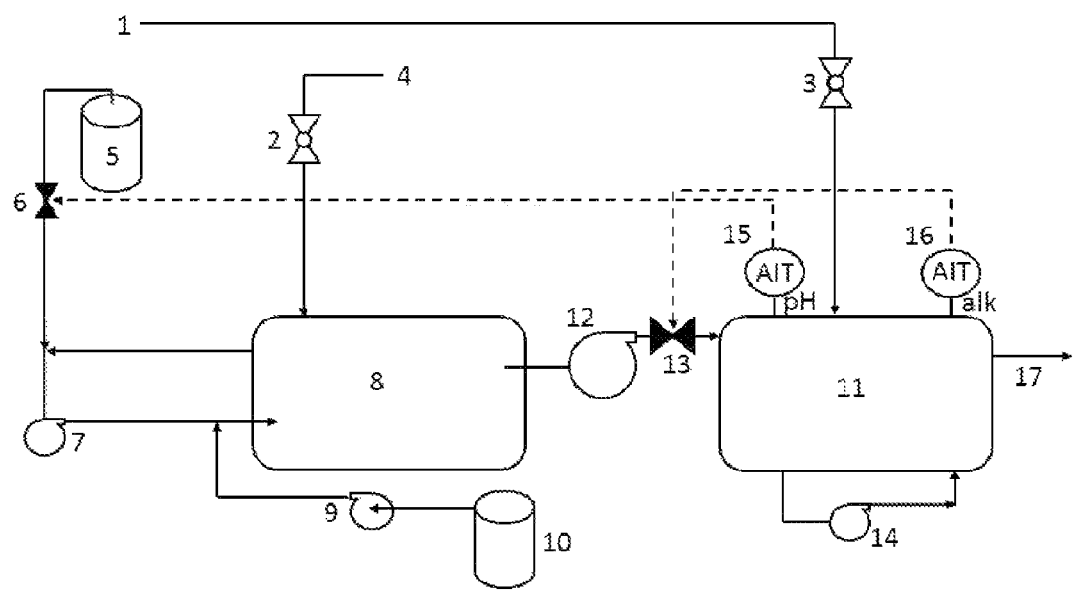
FIG. 9 depicts a schematic of a preliminary exemplary pilot plant designed to demonstrate the effect of magnesium bicarbonate addition to water effluent.

A schematic of an exemplary pilot plant designed to test magnesium bicarbonate addition is presented in FIG. 9. The supply 1 for the pilot plant was clarifier effluent from an industrial water treatment plant. Flow rate of supply 1 to the pilot plant was manually controlled by valve 2. Valve 3 controlled the flow of make-up water supply 4 having best available water quality to prepare a magnesium bicarbonate solution for addition to supply 1. Carbon dioxide, $CO_2$, was fed from compressed gas cylinder 5 and $CO_2$ flow rate was controlled by $CO_2$ automatic flow control valve 6, prior to its introduction into the suction of bicarbonation mix pump 7, which recirculated and mixed the contents of bicarbonation reactor 8. Magnesium hydroxide ($Mg(OH)_2$) was fed into the discharge of bicarbonation mix pump 7 by magnesium hydroxide feed pump 9, which was supplied by drum 10 filled with 25% by weight $Mg(OH)_2$ slurry. In bicarbonation reactor 8, $Mg(OH)_2$ was dissolved by carbonic acid ($H_2CO_3$) (which had been formed by the reaction of $CO_2$ with water ($H_2O$)) to form magnesium bicarbonate ($Mg(HCO_3)_2$). $Mg(HCO_3)_2$ was pumped from bicarbonation reactor 8 into effluent conditioning tank 11 by magnesium bicarbonate feed pump 12, the flow rate from which is controlled by magnesium bicarbonate automatic flow control valve 13. The contents of effluent conditioning tank 11 were mixed and recirculated by effluent conditioning mix pump 14. Effluent conditioning relied on pH and Alkalinity. pH was controlled by pH sensor and controller 15, which modulated $CO_2$ flow control valve 6. Alkalinity was controlled by in-line alkalinity analyzer 16, which modulated magnesium bicarbonate automatic flow control valve 13. After approximately 30 minutes of hydraulic residence time (HRT) in effluent conditioning tank 11, ion-ratio-balanced effluent 17 was discharged.

Figure 10:
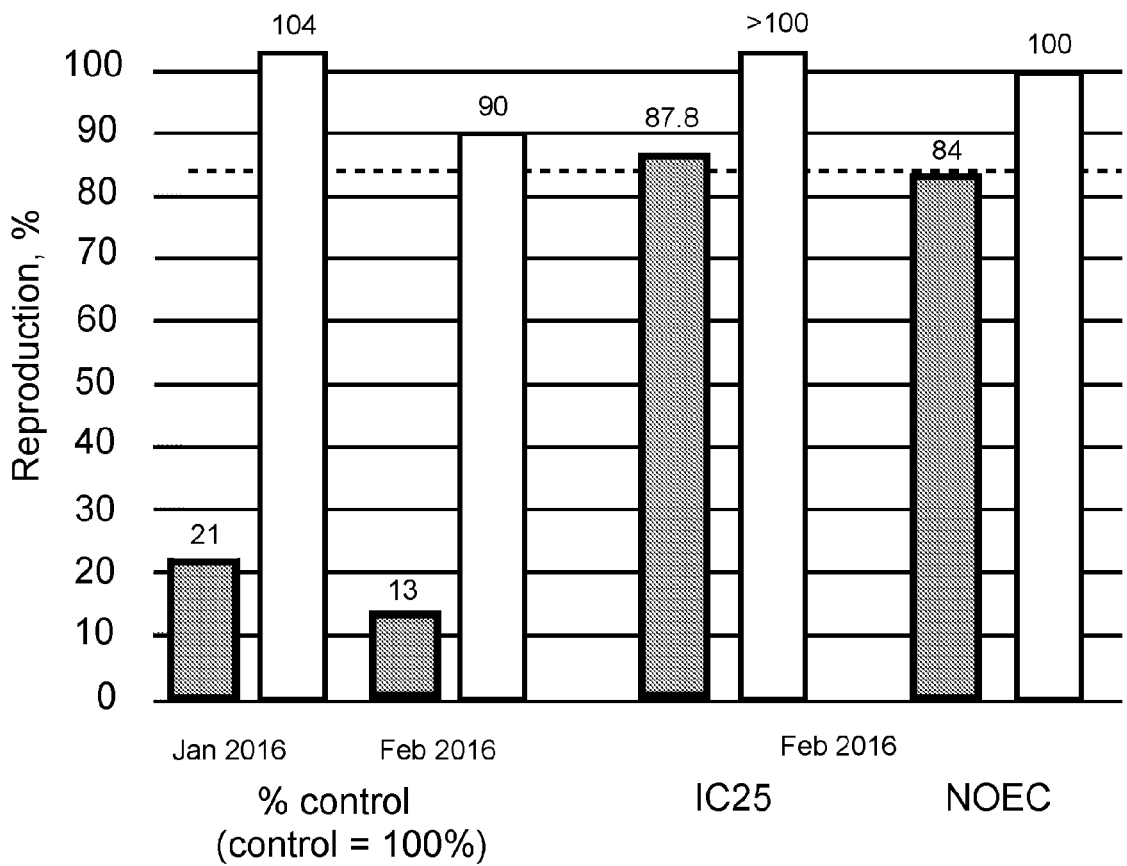
FIG. 10 depicts WET testing results from January and February 2016 from the preliminary pilot plant shown in FIG. 9.

The preliminary pilot plant results of amending the industrial effluent with magnesium bicarbonate ($Mg(HCO_3)_2$) are presented in FIG. 10. The January 2016 sample was obtained to verify the ability of the pilot plant to produce the required $Mg(HCO_3)_2$ solution. The sample reproduction was compared to control reproduction (defined as 100%) and unamended industrial effluent reproduction. Unamended industrial effluent reproduction was 21%, while pilot plant effluent reproduction was 104%. The February 2016 sample was subjected to a complete series of WET test dilutions so that regulatory endpoints could be calculated for both unamended industrial effluent and pilot plant effluent. There are two regulatory endpoints, both of which must be satisfied for a passing WET test. Both the IC25 (the effluent dilution at which 25% of the test organism population is affected) and the No Observed Effect Concentration (NOEC) must be greater than or equal to the Instream Waste Concentration (the volume % of the receiving stream made up of the effluent), which for this test was 84%. The pilot reproduction was 90% of control, while the unamended industrial effluent reproduction was 13%. The IC25 for the pilot plant effluent was >100%, while the unamended industrial effluent was 87.8%. The NOEC for the pilot plant effluent was 100%, while the unamended industrial effluent was 84%. The unamended effluent barely passed the regulatory endpoints for February, while the pilot plant effluent demonstrated the elimination of toxicity by producing the highest possible numerical results. Thus, the critical ion ratios for this industrial effluent ($Ca^{2+}:Mg^{2+}$; $Na^+:Mg^{2+}$; $Cl^-$:Alkalinity; $SO_4^{2-}$:Alkalinity) were balanced by the addition of 0.5 mM (milliMolar) magnesium bicarbonate solution, which completely detoxified the industrial effluent (at 1,700 mg/L TDS).

The results of the WET testing described herein, plus additional testing over a range of chemistries, permit the development of a log-logistic regression equation that predicts chronic toxicity from the concentrations of the major ions, expressed as ion ratios. Conceptual ion-ratio toxicity curves are depicted in FIGS. 11A-11C. FIG. 11A is a positively-sloped curve. FIG. 11B is a negatively-sloped. A composite curve is depicted in FIG. 11C. The formula for the predictive equation is:

$$R_{effluent} = \prod_{i=1}^{42} \frac{1}{\left(1 + \left[\frac{EC50_i}{ratio_i}\right]^{slope_i}\right)} \quad \text{Equation 1}$$

where: $R_{effluent}$=organismal response (e.g., survival, growth, or reproduction, expressed as a proportion of the control-organism response) predicted in the effluent due to the major-ion mixture toxicity;
Π=the product operator, which signifies that each term is independent and the final reproduction is calculated by multiplying together the 42 individual terms: 21 terms for the left-hand (positively-sloped) toxicity response curve (reference numeral 1 in Drawing 11A, and 21 terms for the right-hand (negatively-sloped) toxicity response curve (reference numeral 3 in Drawing 11B;
$EC50$=the value of the molar ion ratio at which 50% impairment of the toxicity endpoint occurs (i.e., the molar ion ratio at which 50% survival, growth, or reproduction occurs, compared to the control response: reference numeral 2 and 4 in Drawings 11A and 11B, respectively), when that ion ratio is the only toxic ion ratio in the exposure water (as determined in a separate toxicity test);
ratio=the molar ratio of an ion pair in the effluent (e.g., moles $Ca^{2+}$/L divided by moles $Mg^{2+}$/L for the molar $Ca^{2+}:Mg^{2+}$ ratio);
slope=the slope of the log-logit regression of response proportion versus molar ion ratio, when that ion ratio is the only toxic ion ratio in the exposure water (as determined in a separate toxicity test); and
i=a counter ranging from 1 to 42, for each of the possible log-logit regressions for the ion ratios.

There are 42 possible log-logit regression slopes and EC50 values, because each of the 21 different ion ratios will have (a) a log-logit regression to represent the upward-trending half of the response curve to the left of the optimum molar ratio for that ion pair (i.e., to the left of the molar ion ratio at which the highest survival, growth, or reproduction occurs when that ion ratio is the only toxic ion ratio in the exposure water, as determined in a separate toxicity test: reference numeral 1 in FIGS. 11A and 11B and (b) a corresponding log-logit regression to represent the downward-trending half of the response curve to the right of the optimum molar ratio for that ion pair (reference numeral 3 in FIG. 11B). For example, the ion pair (e.g., the $Ca^{2+}:Mg^{2+}$, $SO_4^{2-}$:Alkalinity) will have a positive slope and a positive EC50 for the upward-trending half of the response curve to the left of the optimum molar ratio for that ion pair (reference numeral 1 in FIG. 11A), and a negative slope and a positive EC50 for the downward-trending half of the response curve to the right of the optimum molar ratio for that ion pair (reference numeral 3 in FIG. 11B). The EC50 is the ion ratio at which 50% of the toxicological response (e.g., lethality, growth, reproduction) occurs (reference numerals 2 and 4 in FIGS. 11A and 11B, respectively). Together, the proportional responses for the two halves of the response curve for that ion pair, when multiplied together, result in the overall predicted proportional response at any specified value of the molar ion ratio. This results in a bell-shaped response curve, when plotted on a semi-logarithmic chart (reference numeral 5 in FIG. 11C). In FIGS. 11A-11C, the optimal molar ion ratio for reproduction is represented as 1× on each horizontal axis. Higher and lower ratios than 1× result in less-than-optimal toxicological response (i.e., survival, growth, reproduction).

The foregoing embodiments have been presented for the purpose of illustration and description only and are not to be construed as limiting the scope of the invention in any way.

What is claimed is:
1. A system for managing toxicity from high-total dissolved solids (TDS) effluents by ion-ratio balancing comprising:
an effluent having high TDS, the TDS comprising one or more dissolved solids, wherein the one or more dissolved solids cause imbalance in major ion ratios that impart aquatic toxicity to the effluent; and
an addition scheme through which one or more balancing salts are added to the effluent which balance one or more of the major ion ratios in the effluent,
wherein the one or more balancing salts is ascertained by:
determining by chemical analysis testing of the effluent the major ion ratios in the effluent that are imbalanced;
determining WET toxicity for the anion:anion, cation:cation, and cation:anion ion-ratios of major ions present in the effluent;
determining presence and concentration of other potential toxicants in the effluent;
predicting major ion ratios critical to effluent aquatic toxicity based on the major ion ratios in the effluent that are imbalanced;
identifying one or more balancing salts to decrease the major ion ratio in the effluent of the major ion ratios that are imbalanced and that are predicted to be critical to effluent aquatic toxicity; and quantifying a dosage of identified one or more balancing salts to balance the major ion ratios in the effluent of the major ion ratios that are predicted to be critical to effluent aquatic toxicity,
wherein the major ions consist essentially of $Ca^{2+}$, $Mg^{2+}$, $K^+$, $Na^+$; $Cl^-$, $SO_4^{2-}$ and $HCO^{3-}$.

2. The system of claim 1, wherein the other potential toxicants consist essentially of Al, Cd, Cu, Fe, Pb, Mn, Zn or combinations thereof.

3. The system of claim 1, wherein predicting major ion ratios critical to effluent aquatic toxicity based on imbalances of the major ion ratios in the effluent; identifying one or more balancing salts to decrease the major ion ratio in the effluent of the major ion ratios that are imbalanced and that are predicted to be critical to effluent aquatic toxicity; and quantifying a dosage of identified one or more balancing salts to balance the major ion ratios in the effluent of the major ion ratios that are predicted to be critical to effluent aquatic toxicity is determined by:

charting WET test results of test organisms vs. % concentration of the major ions, molar concentration ratios of each major ion pair, and concentration of other toxicants;

determining "goodness of fit" of the charted WET test results to sigmoid concentration-response curves, and discarding the charted WET test results that do not demonstrate a clear concentration-response relationship;

thereafter determining major ion deficiency by identifying concentration-response curves that exhibit a positive slope on the non-discarded charted WET test results of % toxicological response vs. ion concentration;

thereafter ranking major ion deficiency from most deficient major ions to least deficient major ions;

determining metal toxicity by identifying concentration-response curves that have a negative slope on the non-discarded charted WET test results of % toxicological response vs. metal concentration;

determining major ion-ratio toxicity by identifying concentration-response curves that have a negative slope on the non-discarded charted WET test results of % toxicological response vs. major ion-ratio when the deficient major ion is in the denominator of the major ion-ratio;

ranking major ion-ratio toxicity from most toxic major ion-ratio to least toxic major ion-ratio;

determining, for each toxic major ion-ratio chart, a "Threshold of Impairment," wherein the Threshold of Impairment comprises the major ion-ratio at which a decrease in the toxicological response is first observed;

normalizing each major ion-ratio by dividing each major ion-ratio by the respective Threshold of Impairment, wherein a normalized major ion-ratio of >1 signifies impairment due to that major ion-ratio and a normalized major ion-ratio of ≤1 signifies no impairment due to that major ion-ratio;

identifying major ion-ratios that are critical to the toxicity of the effluent, wherein critical major ion-ratios comprise numerically higher normalized major ion-ratios;

determining, for the major ion-ratios that are identified as critical to the toxicity of the effluent, the amounts of ions that would be required to reduce the numerically higher normalized major ion-ratios to unity, without adding a counter-ion that would increase other normalized major ion-ratios to >1;

determining appropriate one or more balancing salts to achieve balanced major ion-ratios of the major ion-ratios that are critical to the toxicity of the effluent, wherein the appropriate one or more balancing salts contribute deficient major ions, decrease the normalized major ion-ratios of the major ion-ratios that are critical to toxicity of the effluent to ≤1, and create no new normalized major ion-ratios with a value>1;

calculating the amount of appropriate one or more balancing salts to be added to the effluent; and confirming that addition of the appropriate one or more balancing salts will not cause imbalances in the major ion-ratios in the effluent following addition of the appropriate one or more balancing salts.

4. The system of claim 1, wherein the concentration of TDS in the effluent is >1,000 mg/L.

5. The system of claim 1, wherein the addition scheme comprises injection of a solution comprising the appropriate one or more balancing salts into the effluent.

6. The system of claim 1, wherein the addition scheme comprises mixing of a solution comprising the appropriate one or more balancing salts with the effluent.

7. A method for decreasing major ion ratio aquatic toxicity from high-total dissolved solids (TDS) in effluents comprising:

determining deficient major ions in an effluent by chemical analysis testing of the effluent;

determining WET toxicity for anion:anion, cation:cation, and cation:anion ion-ratios of major ions $Ca^{2+}$, $Mg^{2+}$, $K^+$, $Na^+$; $Cl^-$, $SO_4^{2-}$ and $HCO_3^-$ present in the effluent;

determining presence and concentration of other potential toxicants in the effluent;

predicting major ion ratios critical to effluent aquatic toxicity based on the major ion ratios in the effluent that are imbalanced;

identifying one or more balancing salts to decrease major ion ratio in the effluent of the major ion ratios that are imbalanced and that are predicted to be critical to effluent aquatic toxicity;

quantifying a dosage of identified one or more balancing salts to balance major ion ratios in the effluent of the major ion ratios that are predicted to be critical to effluent aquatic toxicity; and applying the quantified dosage of identified one or more balancing salts to the effluent, wherein the major ions consist essentially of $Ca^{2+}$, $Mg^{2+}$, $K^+$, $Na^+$; $Cl^-$, $SO_4^{2-}$ and $HCO^{3-}$.

8. The method of claim 7, wherein the other potential toxicants consist essentially of Al, Cd, Cu, Fe, Pb, Mn, Zn and combinations thereof.

9. The method of claim 7, wherein predicting major ion ratios critical to effluent aquatic toxicity based on the major ion ratios in the effluent that are imbalanced; identifying one or more balancing salts to decrease major ion ratio in the effluent of the major ion ratios that are imbalanced and that are predicted to be critical to effluent aquatic toxicity; and quantifying a dosage of identified one or more balancing salts to balance major ion ratios in the effluent of the major ion ratios that are predicted to be critical to effluent aquatic toxicity is determined by:

charting WET test results of test organisms vs. % concentration of major ions, molar concentration ratios of each major ion pair, and other potential toxicants;

determining "goodness of fit" of the charted WET test results to sigmoid concentration-response curves, and discarding the charted WET test results that do not demonstrate a clear concentration-response relationship;

thereafter determining major ion deficiency by identifying concentration-response curves that exhibit a positive slope on the non-discarded charted WET test results of % toxicological response vs. major ion concentration;

thereafter ranking major ion deficiency from most deficient major ions to least deficient major ions;

determining metal toxicity by identifying concentration-response curves that have a negative slope on the non-discarded charted WET test results of % toxicological response vs. metal concentration;

determining major ion-ratio toxicity by identifying concentration-response curves that have a negative slope on the non-discarded charted WET test results of % toxicological response vs. major ion-ratio when the deficient major ion is in the denominator of the major ion-ratio;

ranking major ion-ratio toxicity from most toxic major ion-ratio to least toxic major ion-ratio;

determining, for each toxic major ion-ratio chart, a "Threshold of Impairment," wherein the Threshold of Impairment comprises the major ion-ratio at which a decrease in the toxicological response is first observed;

normalizing each major ion-ratio by dividing each major ion-ratio by the respective Threshold of Impairment, wherein a normalized major ion-ratio of >1 signifies impairment due to that major ion-ratio and a normalized major ion-ratio of ≤1 signifies no impairment due to that major ion-ratio;

identifying major ion-ratios that are critical to the toxicity of the effluent, wherein critical major ion-ratios comprise numerically higher normalized major ion-ratios;

determining, for the major ion-ratios that are identified as critical to the toxicity of the effluent, the amounts of ions that would be required to reduce the numerically higher normalized major ion-ratios to unity, without adding a counter-ion that would increase other normalized major ion-ratios to >1;

determining appropriate one or more balancing salts to achieve balanced major ion-ratios of the major ion-ratios that are critical to the toxicity of the effluent, wherein the appropriate one or more balancing salts contribute deficient ions, decrease the normalized major ion-ratios of the ion-ratios that are critical to toxicity of the effluent to ≤1, and create no new normalized major ion ratios with a value>1;

calculating the amount of appropriate one or more balancing salts to be added to the effluent; and confirming that addition of the appropriate one or more balancing salts will not cause imbalances in the major ion-ratios in the effluent following addition of the appropriate one or more balancing salts.

10. The method of claim 7, wherein the concentration of TDS in the effluent is >1,000 mg/L.

11. The method of claim 7, wherein applying the dosage of identified one or more balancing salts to the effluent comprises injection of a solution comprising the identified balancing salts into the effluent.

12. The method of claim 7, wherein applying the dosage of identified one or more balancing salts to the effluent comprises mixing of a solution comprising the identified one or more balancing salts with the effluent.

* * * * *